United States Patent Office 3,372,496
Patented Mar. 12, 1968

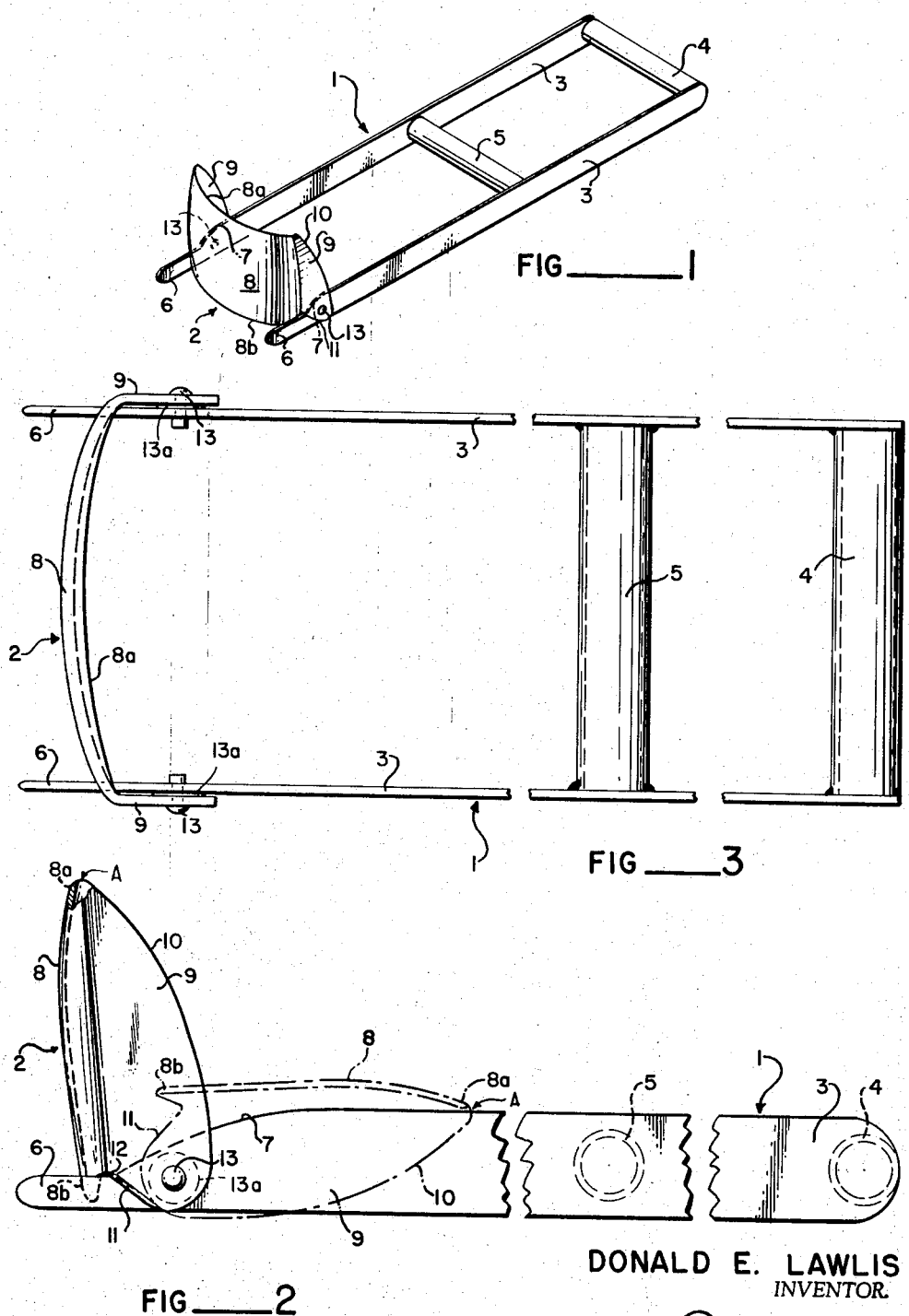

3,372,496
CLAM GUN
Donald E. Lawlis, Buckley, Wash., assignor to Del-Guy Dispensers Inc., Buckley, Wash., a corporation of Washington
Filed Nov. 23, 1964, Ser. No. 413,139
2 Claims. (Cl. 37—119)

ABSTRACT OF THE DISCLOSURE

A clam digging shovel having two parallel handles or shafts with a blade pivotally mounted between the handles on an axis spaced a short distance from adjacent ends of the handles. The blade has a longitudinally and transversely curved surface with parallel side plates which are pivoted to the respective handes so as to limit the pivotal movement of the blade between position generally parallel to the handles and extending upwardly when the handles are inserted into the ground. The forces acting on the blade when the shovel is retracted cause the blade to pivot to a position generally at right angles to the handles thereby lifting a quantity of sand or dirt by merely inserting the handles into the ground and then retracting them in the reverse direction.

---

The present invention relates to clam guns or shovels in general and more specifically to an improved clam digging shovel having a rigid handle and a specially constructed, pivotally mounted blade for cooperation with the handle.

Since clams must be individually removed from a sandy beach, the common practice is to utilize what is known as a clam gun which is merely a specially shaped shovel much like a common garden spade except for a pronounced curvature of the rigid blade in the longitudinal direction. In use, the operator quickly drives the shovel into the soft sand a short distance on the water side of a spot where a clam is believed to be located. As he does this, the clam begins to move downwardly in the sand and toward the water. Because of the curvature of the blade of a conventional clam gun, when driven into the loose sand, the gun takes a curved path downwardly and then upwardly in a more or less scooping action in hopes of locating the clam which is then removed from the sand. As can be appreciated, this procedure frequently causes the clam to be sliced or mutilated since it is impossible to know exactly where the rapidly moving clam is located when the clam gun is driven into the sand. A large percentage of the clams dug by this method are so damaged as to lose their utility.

The improved clam gun of the present invention eliminates the possibility of damaging the clam during digging when properly used. The present clam gun includes a rigid handle with a pivoted shovel blade which orients itself to a vertical position when the clam gun is driven into the sand and then pivots to a horizontal position when the gun is removed. There is thus no arcuate scooping motion of the blade during digging. The present clam gun is simply driven vertically into the sand between the clam and the water and then quickly raised again vertically to remove the area of sand adjacent the clam. The handle of the present clam gun is made of two laterally spaced vertical shafts which serve to balance the gun during operation.

The present invention is of particular importance in the commercial digging of clams since it is essential to take the clams alive and unmutilated to be fit for use.

The primary object of the present invention is, therefore, to provide a novel clam gun which makes it possible to remove individual clams from a sandy bed with little possibility of damage to the clam.

Another object of the present invention is to provide a clam gun which can be operated quickly and efficiently by merely using an up and down vertical motion rather than the scooping action of a conventional clam gun.

Another object of the present invention is to provide a clam gun having a pivoted blade which operates automatically to remove a section of sand adjacent the clam merely by vertical reciprocation of the handle portion of the gun.

A further object of the present invention is to provide a clam gun which enables a more sure method of exposing the clam for removal from a sandy bed.

The means by which the foregoing objects and advantages are accomplished are set forth in the following specification and claims and are illustrated in the accompanying drawings dealing with a preferred embodiment of the invention.

Referring now to the drawings wherein like reference ings in which:

FIG. 1 is a perspective view of the clam gun of the present invention;

FIG. 2 is a side elevation of the clam gun; and

FIG. 3 is a plan view of the clam gun.

Referring now to the drawing wherein like reference numerals are used to indicate identical parts in the various views, the clam gun of the present invention comprises a handle portion indicated generally at 1 and a blade assembly indicated generally at 2. The handle portion 1 is constructed from two identical handle shafts 3 held in spaced relationship by means of a grip bar 4 and a foot piece 5 which may also be used for lifting. The grip bar 4 and the foot piece 5 may be secured between the two handle shafts 3 by any suitable means such as welding or bolting and are preferably in the form of a cylindrical rod or pipe. The width of the members 4 and 5 and hence the spacing of the handle shaft 3 may be varied as desired but are preferably spaced at a distance of approximately 4½ to 5 inches.

The handle shafts 3 are preferably made of metal and may be formed from strap iron or the like to be flat and narrow so as to offer less resistance when driven into the sand. The end of each of the handle shafts 3 is provided with a narrow tip 6 which may be shapened or pointed for easy penetration, as shown in the drawings, and a curved contour section 7 forming the transition between the handle tips 6 and the wide portion of the handle shaft. The handle shafts with their tips 6 act as a stabilizer in the loose sand to prevent shifting in the surf.

The blade assembly 2 includes a curved or dished shape bottom 8 which may be generally rectangular or square in plan and is curved along both its transverse and longitudinal axes as shown in the drawings to give it maximum strength. The blade assembly 2 may be made from sheet metal or the like and will also include identical upstanding side plates 9 which serve to further strengthen the blade and are preferably integral with the curved bottom 8. The sire plates 9 are parallel with each other and with the planes of the handle shafts 3 as shown clearly in FIG. 3.

The side plates 9 have a curved rear edge portion 10 which is curved upwardly and backwardly from the rear edge 8a of the blade to a position adjacent the front edge 8b of the blade. The curved edge 10 serves to facilitate penetration of the sand as the gun is removed upwardly. It will also be noted that both the front and rear edges 8b and 8a of the blade are sharpened to insure easy penetration of the sand. At the front edge of the side plates 9, they are reversely curved as at 11 to form an indented notch 12 adjacent the juncture between the plates 9 and the blade bottom 8. The curved portion 11 is also sharpened to form a cutting edge. Each of the side plates 9 are pivotally attached to the ends of the handle shafts 3 in the area of a curved portion 7 by means of suitable pivot pins 13. The pivot pins 13 may constitute rivets or the like and are preferably loose or free floating to prevent binding by sand. A washer 13a may also be located between each shaft 3 and plate 9 to prevent binding. With the described structure, the blade assembly 2 may be moved to a position at substantially right angles to the shaft 3, as shown by the full line portion of FIG. 2, with the notches 12 on each side of the blade assembly engaging the narrow tip portions 6 of the shaft. Since the notches 12 are spaced from the pivot pins 13, the engagement between the blade assembly and the ends of the shaft 3 provide a stop means for further pivoting or opening of the blade assembly. The full line position shown in FIG. 2 represents one extreme rotative position of the blade assembly.

As shown in FIG. 2, a given point A located at the center of the rear edge 8a of the shovel bottom moves between the position shown, with the blade assembly in a full line position in FIG. 2, to a second position indicated by the dotted line position of the blade assembly in FIG. 2. The dotted line position represents the closed or second extreme position of rotation of the blade assembly. In actual practice, the angle of rotation through which the blade assembly 2 is preferably permitted to travel is approximately 90 degrees as seen in FIG. 2. Since the side plates 9 are located and pivoted to the outside surfaces of the handle shafts 3, the blade assembly 2 is prevented from further rotating past the dotted line position shown in FIG. 2 thus providing a stop means for the second extreme position of the blade.

In operation, the person digging clams will grasp the grip bar 4 and may use the piece 5 to shove the clam gun vertically downwardly adjacent a buried clam and on the water side of the clam. When the gun is first inserted into the sand, the blade assembly 2 is in the dotted line position as shown in FIG. 2 or closed and the general plane of the bottom 8 of the shovel blade is vertical and parallel with the handle shafts 3. Since the front edge 8b of the bottom is tapered or sharpened, and since the ends of the shafts 3 are pointed or tapered, the gun offers little resistance to insertion into the sand. Also, since the pivot point 13 is offset from the edge 8b, the upward forces acting on the edge will tend to maintain the shovel blade 2 in its closed or dotted line position as long as the gun is moving downwardly in the sand. As soon as the operator believes that he is deep enough to catch the clam, he lifts vertically upwardly on the handle shaft 3 to remove the gun. As soon as the gun starts to move upwardly, the resistance forces acting on the rear edge 8a of the blade assembly 2 will then automatically cause the entire blade assembly to pivot about the points 13 to the full line position shown in FIG. 2, offering maximum resistance to the removal of the gun resulting in the removal of the body of sand adjacent the clam.

The changes of cutting or mutilating the clam by contact with the shovel blade of the present device are very slim since, if used properly, the sharpened edges of the shovel will not intersect the path of a moving clam. The fact that there is no lateral travel of the shovel blades also diminishes the chances of cutting the clam. In addition to the above noted advantages of the gun structure, the spaced vertical handle and cross bar structure to provide an excellent "prop" or "crutch" to balance a person kneeling in the surf to extract clams since the tide normally causes loss of balance.

It will thus be understood by those skilled in the art that the present invention provides novel and useful improvements in clam guns of the character described. The arrangement and type of structural components utilized within this invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A clam gun comprising, two spaced elongated parallel handles, a grip element extending between said handles and secured thereto at one end of said handles, a cross bar extending between said handles and secured thereto intermediate the ends thereof, said handles being substantially equal in length and terminating in tapered end portions remote from said grip element, a generally rectangular dished blade member having upstanding side plates extending along opposite sides thereof, each of said side plates being convexly curved outwardly from the rear edge of said blade and extending the length of the blade, said side plates including a reversely curved front edge forming a notch adjacent the front edge of said blade, and pivot means for rotatably mounting said plates on the spaced handles with said plates being disposed on the outside surfaces thereof, said pivot means being spaced from said notches and adjacent the front edge of the plates, whereby forces on the front edge of the blade exerted by thrusting the clam gun into the ground will pivot said blade to a position generally parallel with the plane of said handles and forces acting on the rear edge of said blade upon retraction of the clam gun will pivot said blade to a position at substantially right angles to the plane of the handles.

2. The combination according to claim 1 wherein said front and rear edges of said blade and the rear edges of said plates are sharpened to form cutting edges.

References Cited

UNITED STATES PATENTS 57,614 8/1866 Winegar _____ 294—53.4

FOREIGN PATENTS 484,610 5/1938 Great Britain.
513,718 10/1939 Great Britain.

ABRAHAM G. STONE, *Primary Examiner.*

A. E. KOPECKI, *Assistant Examiner.*